(12) United States Patent
Hu et al.

(10) Patent No.: US 9,958,991 B2
(45) Date of Patent: May 1, 2018

(54) INPUT DEVICE AND INPUT METHOD

(71) Applicant: Touchplus Information Corp., New Taipei (TW)

(72) Inventors: Shih-Hsien Hu, New Taipei (TW); Yi-Feng Wei, New Taipei (TW); Yao-Chih Chuang, Tainan (TW)

(73) Assignee: TOUCHPLUS INFORMATION CORP., New Taipei (TW)

( * ) Notice: Subject to any disclaimer, the term of this patent is extended or adjusted under 35 U.S.C. 154(b) by 2 days.

(21) Appl. No.: 14/656,228

(22) Filed: Mar. 12, 2015

(65) Prior Publication Data

US 2015/0261354 A1   Sep. 17, 2015

(30) Foreign Application Priority Data

Mar. 12, 2014 (TW) .............................. 103108754 A

(51) Int. Cl.
| | |
|---|---|
| G06F 3/044 | (2006.01) |
| G06F 3/038 | (2013.01) |
| G06F 3/02 | (2006.01) |
| G06F 3/023 | (2006.01) |
| G06F 3/0485 | (2013.01) |

(Continued)

(52) U.S. Cl.
CPC ............ *G06F 3/044* (2013.01); *G06F 3/0202* (2013.01); *G06F 3/023* (2013.01); *G06F 3/0213* (2013.01); *G06F 3/0219* (2013.01); *G06F 3/038* (2013.01); *G06F 3/03547* (2013.01); *G06F 3/0485* (2013.01); *G06F 3/04883* (2013.01); *G06F 3/04886* (2013.01); *G06F 3/04892* (2013.01); *G06F 2203/0339* (2013.01)

(58) Field of Classification Search
CPC .......... G06F 3/044; G06F 3/038; G06F 3/014; G06F 21/62
USPC ......................................... 345/163
See application file for complete search history.

(56) References Cited

U.S. PATENT DOCUMENTS 5,844,506 A * 12/1998 Binstead ............... G06F 3/0202
                                                                178/19.01
2005/0257628 A1   11/2005 Nikaido et al.
(Continued)

FOREIGN PATENT DOCUMENTS

TW   201142656   12/2011
TW   201316203   4/2013
(Continued)

OTHER PUBLICATIONS

Taiwan Intellectual Property Office (TIPO), Office Action dated Dec. 22, 2015.

*Primary Examiner* — Fred Tzeng
(74) *Attorney, Agent, or Firm* — WPAT, PC

(57) ABSTRACT

An input device and an input method for a data processing device are provided. The input device includes a touch-sensitive module, an operation prompt interface and a controller. According to the input method, the input device issues a first input signal to the data processing device when a first electrical property change resulting from the keystroke or the tap is sensed in a first operation state. The input device is switched from the first operation state to a second operation state in response to a switching operation. The input device issues a second input signal to the data processing device when a second electrical property change resulting from a touch action is sensed in the second operation state.

18 Claims, 4 Drawing Sheets

(51) Int. Cl.
*G06F 3/0488* (2013.01)
*G06F 3/0354* (2013.01)
*G06F 3/0489* (2013.01)

(56) References Cited

U.S. PATENT DOCUMENTS

| | | | | |
|---|---|---|---|---|
| 2009/0213081 A1* | 8/2009 | Case, Jr. | ................ | G06F 1/1616 345/173 |
| 2010/0103137 A1* | 4/2010 | Ciesla | .................. | G06F 3/0202 345/174 |
| 2011/0179368 A1* | 7/2011 | King | .................. | G06F 3/04815 715/769 |
| 2012/0050167 A1* | 3/2012 | Krahenbuhl | ............ | G06F 1/169 345/169 |
| 2012/0229406 A1* | 9/2012 | Wu | ..................... | G06F 3/04886 345/173 |
| 2012/0242607 A1* | 9/2012 | Ciesla | .................. | G06F 3/0202 345/173 |
| 2013/0109363 A1* | 5/2013 | Yang | .................. | H04M 1/2745 455/414.1 |
| 2013/0135223 A1* | 5/2013 | Shai | ........................ | G06F 3/014 345/173 |
| 2013/0141370 A1 | 6/2013 | Wang et al. | | |
| 2013/0162539 A1 | 6/2013 | Wang et al. | | |
| 2014/0035865 A1 | 2/2014 | Hu | | |
| 2014/0047564 A1* | 2/2014 | McCann | ................. | G06F 21/62 726/30 |
| 2014/0083834 A1 | 3/2014 | Chou et al. | | |
| 2014/0097857 A1 | 4/2014 | Hu | | |
| 2014/0097885 A1 | 4/2014 | Hu | | |
| 2014/0333575 A1 | 11/2014 | Hu | | |
| 2014/0378099 A1* | 12/2014 | Huang | .................... | H04M 1/67 455/411 |
| 2015/0149068 A1* | 5/2015 | Ritchie | ................ | G01C 21/362 701/400 |
| 2015/0153918 A1* | 6/2015 | Chen | ................. | G06F 17/30312 715/771 |
| 2015/0248545 A1* | 9/2015 | Al-Jamal | .......... | H04M 1/72519 345/173 |
| 2015/0304387 A1* | 10/2015 | Landau | ................ | H04L 67/025 715/740 |

FOREIGN PATENT DOCUMENTS

| | | |
|---|---|---|
| TW | 201407430 | 2/2014 |
| TW | 201413549 | 4/2014 |
| TW | 201415334 | 4/2014 |
| TW | M485446 | 9/2014 |
| TW | 201443754 | 11/2014 |

* cited by examiner

INPUT DEVICE AND INPUT METHOD

FIELD OF THE INVENTION

The present disclosure relates to an input device and an input method, and particularly to an input device and an input method for a data processing device.

BACKGROUND OF THE INVENTION

Please refer to FIG. 1 illustrating a structure of a resistive membrane keyboard. The resistive membrane keyboard has a triple layer structure. In the triple layer structure, an intermediate insulating layer 13 is interposed between a top membrane layer 11 and a bottom membrane layer 12. There are conductive traces 110 and 120 mounted on the membrane layers 11 and 12. The intermediate insulating layer 13 has holes corresponding to positions of keys (not shown). When the user presses the key, the conductive traces 110 and 120 are in electrical contact to allow current flow and an input corresponding to the keystroke is sent to a data processing device, e.g. a computer. However, frequent contacts between the conductive traces 110 and 120 cause abrasion which reduces the lifetime of the resistive membrane keyboard. Furthermore, the conventional keyboard can only receive keystroke inputs, but can not accept other inputs such as multi-touch gesture which becomes very popular recently. Therefore, the limited input function of the conventional resistive membrane keyboard is not satisfied for controlling modern electronic apparatus, and a novel input device and method accepting various types of inputs is desired.

SUMMARY OF THE INVENTION

An aspect of the present disclosure provides an input device for a data processing device. The input device includes a touch-sensitive module, an operation prompt interface and a controller. The touch-sensitive module senses a first electrical property change resulting from a keystroke or a tap on the touch-sensitive module and a second electrical property change resulting from a touch action of a touch object on the touch-sensitive module. The operation prompt interface disposed on a surface of the touch-sensitive module indicates regions for receiving the touch action and the keystroke or the tap. The controller issues a first input signal to the data processing device in response to the sensed first electrical property change resulting from the keystroke or the tap, and issues a second input signal to the data processing device in response to the sensed second electrical property change resulting from the touch action.

In an embodiment, the touch-sensitive module is a capacitive touching and pressing module. The capacitive touching and pressing module includes a capacitive sensor layer, an intermediate insulting layer and a common electrode. The capacitive sensor layer senses a capacitance change resulting from the touch action. The intermediate insulting layer is disposed between the capacitive sensor layer and the common electrode and has at least one hole. The keystroke above the hole shortening a distance between the capacitive sensor layer and the common electrode to result in a capacitance change between the capacitive sensor layer and the common electrode.

In an embodiment, the capacitive sensor layer includes a plurality of sensor pads isolated from each other.

In an embodiment, the operation prompt interface includes a keyboard pattern corresponding to the sensor pads.

In an embodiment, at least one key of the keyboard pattern has an area covering more than one of the sensor pads.

In an embodiment, the controller enters a first operation state or a second operation state in response to a switching operation by the user. The controller issues the first input signal to the data processing device in response to the sensed first electrical property change resulting from the keystroke or the tap in the first operation state. The controller issues the second input signal to the data processing device in response to the sensed second electrical property change resulting from the touch action in the second operation state.

In an embodiment, the switching operation includes flicking the key having the area covering more than one sensor pad.

In an embodiment, the controller is in the second operation state. A display of the data processing device is operated in a horizontal scroll mode to scroll left or right an image shown on the display when a double tap on a first end of the key is sensed. The display of the data processing device is operated in a vertical scroll mode to scroll up or down the image shown on the display when a double tap on a second end of the key is sensed. The display of the data processing device is operated in a high resolution mode to precisely move a cursor on the display when a double flick on the key is sensed.

In an embodiment, the controller groups a plurality of adjacent sensor pads into a key group.

In an embodiment, a default operation state of the controller is a first operation state and the first electrical property change resulting from the keystroke or the tap is sensed. The controller is switched from the first operation state to a second operation state in response to a switching operation and the second electrical property change resulting from the touch action is sensed. The controller is switched from the second operation state to the first operation state and the first electrical property change resulting from the keystroke or the tap is sensed if an idle status lasts a predetermined period of time.

In an embodiment, the controller is in a second operation state and the second electrical property change resulting from the touch action is sensed. The controller issues the second input signal representing a left mouse click in response to a tap or a double tap with more than one finger on a left region of the touch-sensitive module. The controller issues the second input signal representing a right mouse click in response to a tap or a double tap with more than one finger on a right region of the touch-sensitive module.

In an embodiment, the touch-sensitive module includes a light source electrically connected to the controller. The controller controls color and brightness of the light source in response to the touch action, the keystroke or the tap.

Another aspect of the present disclosure provides an input method used with an input device for a data processing device. The input device senses a first electrical property change resulting from a keystroke or a tap on the input device and a second electrical property change resulting from a touch action of a touch object on the input device. the input method includes steps of: issuing a first input signal to the data processing device in response to the sensed first electrical property change resulting from the keystroke or the tap in a first operation state; switching the input device from the first operation state to a second operation state in response to a switching operation; and issuing a second input signal to the data processing device in response to the sensed second electrical property change resulting from the touch action in the second operation state.

In an embodiment, a default operation state of the input device is the first operation state and the input device is enabled to sense the keystroke or the tap. The input method includes steps of: switching the input device from the first operation state to the second operation state in response to the switching operation to enable the input device to sense the touch action; and switching the input device from the second operation state to the first operation state to enable the input device to sense the keystroke or the tap if an idle status of the input device lasts a predetermined period of time.

In an embodiment, the input device at least includes a first key and a second key having a larger area than the first key. The switching operation includes flicking the second key.

In an embodiment, the input device is in the second operation state and the input method includes steps of: operating a display of the data processing device in a horizontal scroll mode to scroll left or right an image shown on the display when a double tap on a first end of the second key is sensed; operating the display of the data processing device in a vertical scroll mode to scroll up or down the image shown on the display when a double tap on a second end of the second key is sensed; and operating the display of the data processing device in a high resolution mode to precisely move a cursor on the display when a double flick on the second key is sensed.

In an embodiment, the input device is in the second operation state and the input method includes steps of: issuing the second input signal representing a left mouse click in response to a tap or a double tap with more than one finger on a left region of the input device; and issuing the second input signal representing a right mouse click in response to a tap or a double tap with more than one finger on a right region of the input device.

A further aspect of the present disclosure provides an input device for a data processing device. The input device includes a touch-sensitive module, an operation prompt interface and a controller. The touch-sensitive module senses an electrical property change resulting from a keystroke or a tap on the touch-sensitive module. The operation prompt interface disposed on a surface of the touch-sensitive module indicates regions for receiving the keystroke or the tap. The controller generates a command in response to the sensed electrical property change resulting from the keystroke or the tap, provides at least one symbol code and a plurality of candidate words corresponding to the command according to a built-in input method editor, and issues a word code representing a word selected among the candidate words by the user to the data processing device.

BRIEF DESCRIPTION OF THE DRAWINGS

The advantages of the present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
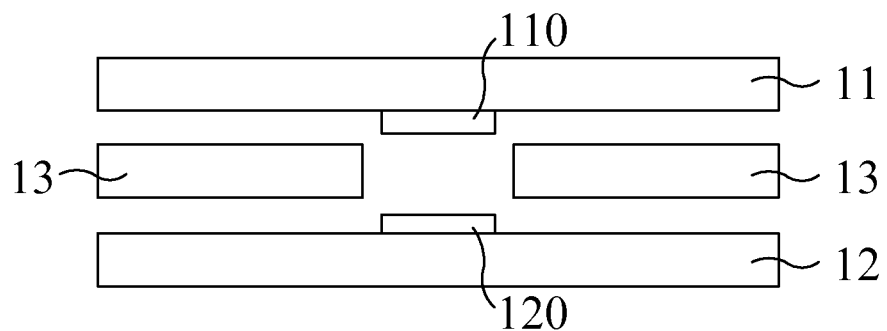
FIG. 1 is a schematic diagram illustrating a structure of a conventional resistive membrane keyboard.
Figure 2:
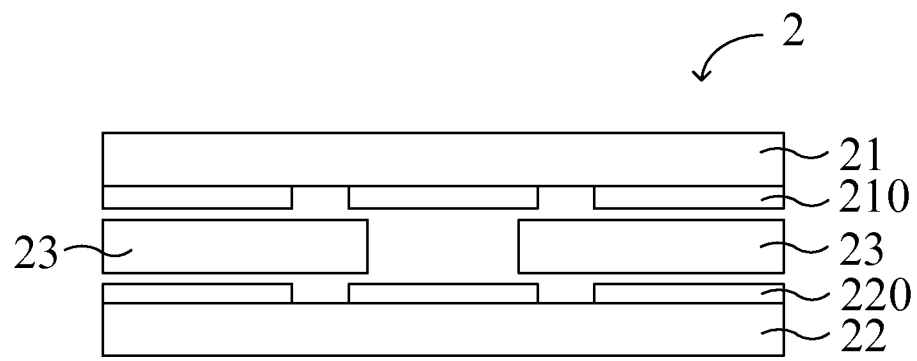
FIG. 2 is a schematic diagram illustrating a structure of a capacitive touching and pressing module of an input device according to an embodiment of the present invention.
Figure 3:
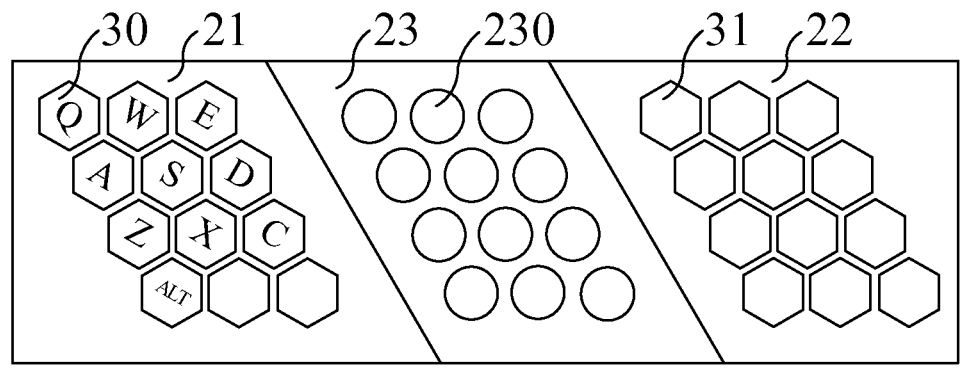
FIG. 3 is a top view illustrating a structure of layers of the capacitive touching and pressing module of FIG. 2.

Please refer to FIG. 2, a schematic diagram illustrating a structure of a capacitive touching and pressing module of an input device, e.g. a capacitive membrane keyboard. The capacitive touching and pressing module 2 has a triple layer structure similar to the conventional resistive membrane keyboard. Therefore, the capacitive touching and pressing module 2 may be manufactured by slightly modifying the manufacturing processes for the resistive membrane keyboard without labored redesign. This gives the capacitive touching and pressing module 2 certain advantages over other membrane keyboards. Please also refer to FIG. 3, a top view showing the structure of the three layers of the capacitive touching and pressing module 2. The conductive structure 210 disposed on the top membrane layer 21 forms sensor pads 30 which are isolated from each other. As shown in FIG. 3, the sensor pads 30 have a honeycomb pattern, but are not limited and the shape may be adjusted to meet special requirements. The conductive structure 220 disposed on the bottom membrane layer 22 forms common electrodes 31 which have a pattern similar to the sensor pads 30. The common electrodes 31 are electrically connected together. In another embodiment, the common electrode is implemented by a whole piece of a conductive layer having any proper shape, and the common electrode should cover the whole regions corresponding to the sensor pads 30. The intermediate insulating layer 23 spaces out the conductive structures 210 and 220 and has holes 230 whose positions correspond to portions of the sensor pads 30 which serve as keys to be pressed.

When the user presses one key, i.e. a key pattern on the top membrane layer 21 which covers the conductive structure 210 (capacitive sensor layer), the top membrane layer 21 deforms because the hole 230 under the key does not support the conductive structure 210 as the surrounding intermediate insulating layer 23. The distance between the sensor pad 30 under the key and the common electrode 31 becomes shorter and some measured electrical properties change, e.g. the capacitance between the specific sensor pad 30 and the common electrode 31. In response to the change of the measured electrical properties, the capacitive touching and pressing module 2 issues an input signal corresponding to a keystroke of the key. On the other hand, when the user takes a touch object (e.g. a stylus, a finger or few fingers) to perform a touch action on the top membrane layer 21 (with or without contacting the top member layer 21), the top membrane layer 21 does not deform but a capacitor is dynamically formed between the touch object and the specific sensor pad 30. In response to the change of the measured capacitance, the capacitive touching and pressing module 2 issues another input signal corresponding to the touch action. The touch action described in the specification may involve multi-touch gesture and floating touch gesture. The multi-touch gesture may involve tap, double tap, long press, scroll, pan, flick, pinch, zoom, rotate, etc. Furthermore, the sensor pads 30 may be arranged on a flat surface or a curved surface. Therefore, both the keystroke and the touch action can be sensed in different orientations and the input device is not restricted to a single-surface input device. The relative description can be read from the published patent applications of TW 201415334, TW M485446, US 2014/0097857 and US 2014/0097885 and US provisional patent application of U.S. Ser. No. 13/724,745, which are incorporated herein for reference.

Figure 4:
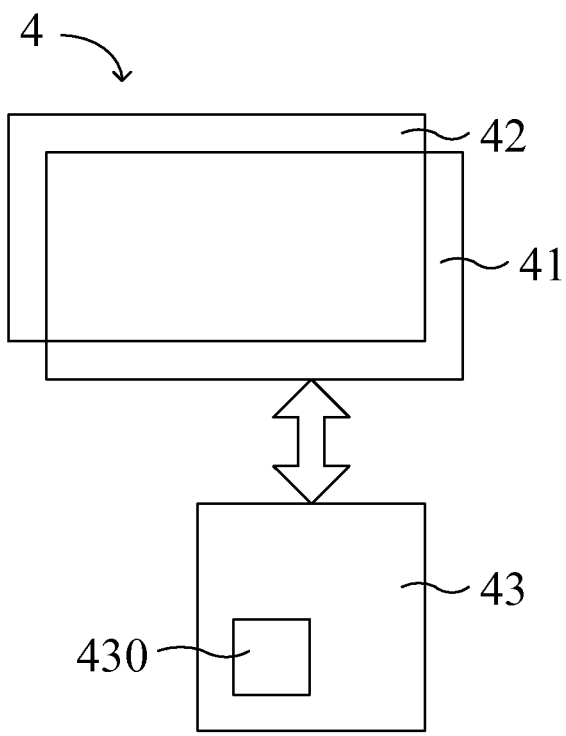
FIG. 4 is a block diagram illustrating an input device according to an embodiment of the present invention.

Please refer to FIG. 4, a block diagram illustrating an input device according to an embodiment of the present invention. For example, the input device 4 is a keyboard with touch-sensitive function and is in communication with a data processing device (not shown). The input device 4 includes a capacitive touching and pressing module 41, an operation prompt interface 42 and a controller 43. The capacitive touching and pressing module 41 senses the capacitance change resulting from a touch action of a touch object and the electrical property change resulting from a keystroke (pressing action). The operation prompt interface 42 is disposed at one side or on a surface of the capacitive touching and pressing module 41 to indicate the regions for receiving the keystroke and the touch action. For example, the operation prompt interface 42 is an insulating layer with a keyboard pattern printed thereon. In another embodiment, the printed keyboard pattern is provided on the top member layer 21 to indicate the regions for receiving the keystroke and the touch action. The term "key" in the following paragraphs may refer to a key pattern of the keyboard pattern. The input device is a capacitive membrane keyboard, and the data processing device is a personal computer, a tablet computer or a notebook computer.

The controller 43 generates various commands in response to the sensed electrical property change of the capacitive touching and pressing module 41. The input of languages other than English, e.g. traditional Chinese or Japanese is much complicated. For example, input method editor (IME) for Chinese input includes phonetic input method, Cangjie input method, Dayi input method, etc. According to these input methods, a Chinese word corresponds to a sequence of symbol codes (e.g. phonetic codes or word roots). Usually, a user is familiar with only one input method editor because the input methods are quite different. If the familiar input method editor is not installed in the data processing device, it is very inconvenient indeed for the user. According to the present disclosure, at least one built-in input method editor is provided in the input device 4. In an embodiment, a database storing many input method editors may be provided in a memory unit 430 in the controller 43 or a peripheral memory unit (not shown), and the user can designate a favorite input method editor as the built-in input method editor. Hence, the input device 4 for personal use can be connected to any data processing device no matter whether the input method editor is installed in the data processing device. In an embodiment, additional keys (not shown) each of which is assigned to an input method editor are provided on the input device 4 so that the input method editor can be activated by a corresponding key. In another embodiment, the input method editor is activated by a keyboard shortcut which is defined in advance. The current input method editor may be indicated by a corresponding light indicator or shown on a display (not shown) of the input device 4 or the data processing device. The controller 43 generates a command in response to the sensed electrical property change (e.g. capacitance change) resulting from the keystroke or the tap on the input device 4. Then, the controller 43 provides at least one symbol code and a plurality of candidate words corresponding to the command according to the built-in input method editor. After the user selects the desired word among the candidate words, the controller 43 issues a word code (e.g. based on Unicode standard or other code standard) representing the selected word to the data processing device to achieve word input. To show the symbol codes (e.g. phonetic codes "ㄅ", "ㄆ", "ㄇ", etc. for phonetic input method editor) while typing and the candidate words, a small display (not shown) may be disposed or embedded on the input device 4. In another embodiment, the symbol codes and the candidate words are shown on the display of the data processing device. In these embodiments, the word code is generated by the controller 43 of the input device 4 rather than the data processing device. Since the word code is based on a standard code, the word can be normally shown on the display of the data processing device even though the input method editor is not installed in the data processing device.

Figure 5:
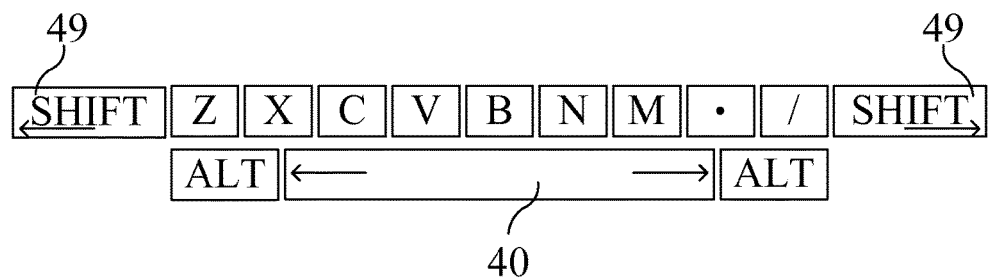
FIG. 5 is a schematic diagram illustrating an input method used with the input device according to an embodiment of the present invention.

The controller 43 in communication with the capacitive touching and pressing module 41 enters a first operation state or a second operation state in response to a switching operation by the user. The input method is described in detail with reference to FIG. 5. It is assumed that a default state is the first operation state, which senses the keystroke but not the touch action. In response to the switching operation, the controller 43 is switched from the first operation state to the second operation state, which senses the touch action instead of the keystroke. For example, when the user flicks the key having larger area (e.g. the space bar 40) along a specific direction as indicated by one arrow in the diagram, it means that the user wants to perform touch control instead of keying letters or characters. Therefore, the controller 43 enters the second operation state. The space bar 40 corresponds to more sensor pads 30 so that the flick operation or sliding operation may be sensed by measuring the capacitance of each of the sensor pads 30 under the space bar 40. In the second operation state, the controller 43 may issue control signals to the data processing device in response to various touch actions to control the display (not shown) of the data processing device. In a first instance, the user performs touch actions (e.g. press and slide) over a surface of the keyboard to position and move a cursor on the display based on an absolute coordinate system. In a second instance, the user double-taps the left end of the space bar 40 to inform the controller 43 to control the display in a horizontal scroll mode. Then, the user flicks the space bar 40 to scroll left/right the image in a window shown on the display. In a third instance, the user double-taps the right end of the space bar 40 to inform the controller 43 to control the display in a vertical scroll mode. Then, the user flicks the space bar 40 to scroll up/down the image in the window shown on the display. In a fourth instance, the user flicks the space bar 40 twice to inform the controller 43 to control the display in a high resolution mode. Thus, the cursor on the display moves slower so as to precisely position the cursor in response to the touch gesture of the user. In a fifth instance, the user taps or double-taps the surface of the keyboard to select a prompt option or confirm the selection. It should be noted that the above-described touch actions or multi-touch gestures are for illustration only, and the present disclosure is not limited to these embodiments. For example, the horizontal scroll mode, the vertical scroll mode and the high resolution mode may be activated by flicking another larger key such as a shift key 49. The above-described input functions can be set or modified in firmware of the controller 43 or through a driver of the input device 4 to meet practical requirements.

If no touch action (touch gesture) or keystroke is sensed (i.e. idle status) during a predefined period of time (e.g. 10 seconds), the controller 43 is switched back to the first operation state.

Figure 6:
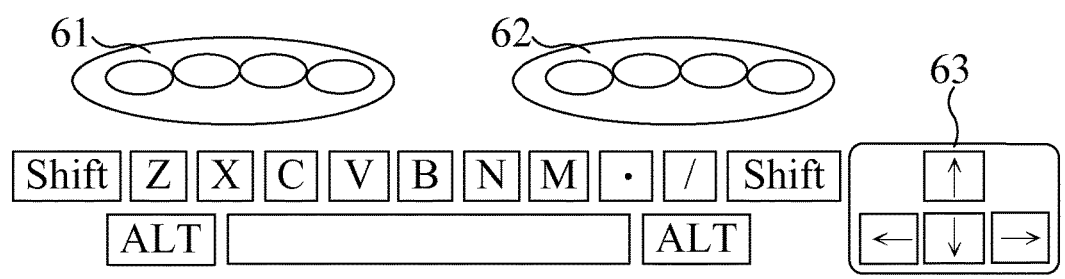
FIG. 6 is a schematic diagram illustrating an input method used with the input device according to another embodiment of the present invention.

Furthermore, the present input device 4 can simulate a mouse click operation. As shown in FIG. 6, when the controller 43 is in the second operation state and the user taps or double-taps the left/right region with more than one left/right finger, the controller 43 issues the input signal representing a left mouse click or a right mouse click. Therefore, the input device 4 can also simulate mouse control.

The input device of the present disclosure has other applications. In an embodiment, a mouse mode of the input device is activated by a specific touch gesture or a specific key press. In the mouse mode, finger sliding along the arrow key region 63 controls the cursor to move along a corresponding direction in a lower resolution. For example, sliding on the arrow key region 63 from left to right moves the cursor on the display in the rightward direction. On the other hand, in the mouse mode, pressing one arrow key in the arrow key region 63 controls the cursor to move in a corresponding direction in a higher resolution to achieve precise positioning. If the input device is not in the mouse mode, flicking the arrow key region 63 represents repeat press of one corresponding arrow key. For example, if the user flicks the arrow key region 63 downwards, the controller 43 issues the input signal representing continuous pressing the DOWN key to the data processing device. Therefore, the arrow key region 63 accepts various operation methods.

Figure 7:
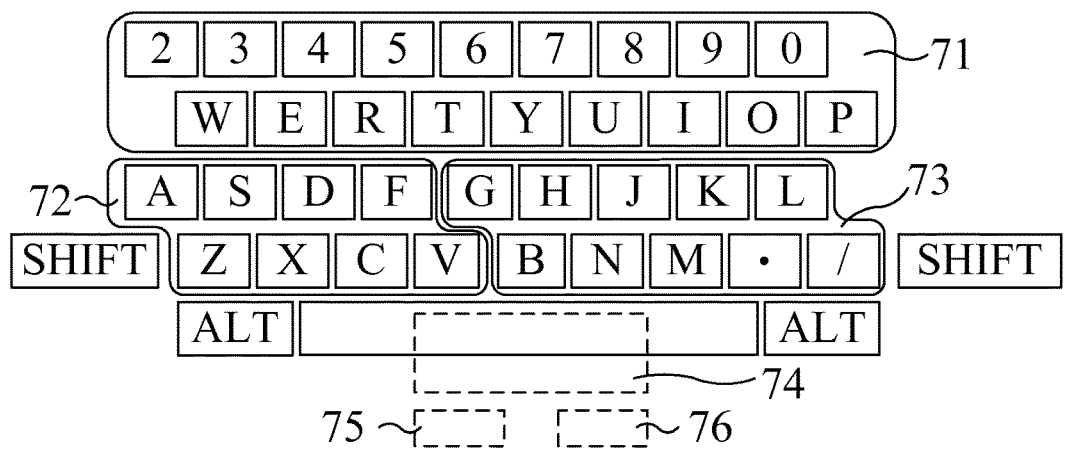
FIG. 7 is a schematic diagram illustrating key groups of the input device according to an embodiment of the present invention.

The input device 4 of the present disclosure can serve as an input interface for a specific game. As shown in FIG. 7, the controller 43 groups several adjacent sensor pads into a key group. There are three key groups 71, 72 and 73 in the diagram, but the number of the key groups is not limited to this embodiment. The number and the size of the key groups are determined according to the operation requirement of the specific game. Therefore, the input device 4 of the present disclosure can be adapted for different games by setting via software or firmware of the controller 43.

When the input device 4 is in the first operation state for sensing the keystroke, a touchpad simulating the mouse input may be defined on the input device 4 through modifying the firmware of the controller 43. Therefore, the user can both type the characters and control the cursor movement in the same operation state. For example, the sensor pads 30 under a portion of the space bar and the sensor pads adjacent to the space bar may be grouped to from a touchpad region 74. Thus, sliding on the touchpad region 74 with user thumb can control the cursor movement in the first operation state (for sensing keystroke). The left button 75 and the right button 76 are defined to simulate the left mouse click and the right mouse click. Therefore, without being switched to the second operation state (for sensing touch action), both the keystroke input and the cursor control can be achieved as required.

Figure 8:
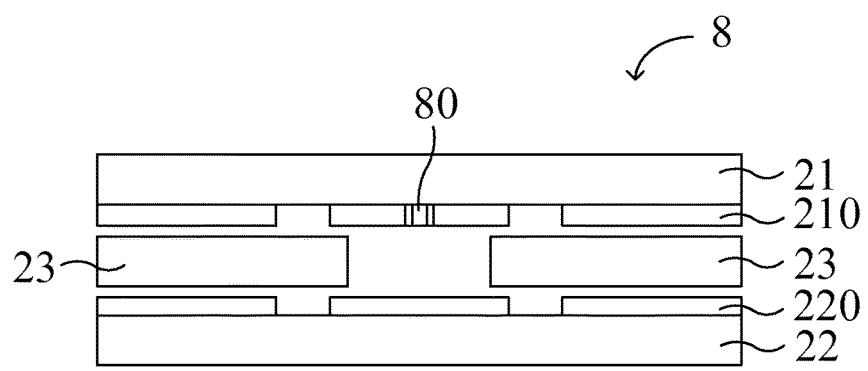
FIG. 8 is a schematic diagram illustrating a structure of a capacitive touching and pressing module of an input device according to another embodiment of the present invention.

The material of the top membrane layer 21 maybe transparent, translucent or opaque. Please refer to FIG. 8, a schematic diagram illustrating a structure of a capacitive touching and pressing module of an input device. In the capacitive touching and pressing module 8, at least one light-emitting diode (LED) unit 80 is disposed in one or more of the sensor pads 30. Each of the light-emitting diode unit 80 is directly electrically connected to the controller 43 or electrically connected to the controller 43 through the respective sensor pad 30. The controller 43 controls the illuminating effect, e.g. color or brightness, of the light-emitting diode unit 80 in response to the keystroke and the touch action. Hence, it assists the user in operating the input device 4 and provides enjoyable experience. It is to be noted that the light-emitting diode unit 80 may be substituted with other light source, e.g. organic light-emitting diode (OLED) unit.

If the press feeling and tactile feedback is not required, the capacitive touching and pressing module 41 may be replaced by a touch-sensitive module, e.g. capacitive touch-sensitive module. The relative description can be read from the published patent applications of TW 201407430, TW 201413549, TW 201443754, US 2014/0035865, US 2014/0083834 and US 2014/0333575. It is only required that the touch-sensitive module can sense a first electrical property change resulting from the keystroke or tap of the key and a second electrical property change resulting from the touch action of the touch object (e.g. sliding along the designated surface) so that the input device 4 accept various types of inputs. Thus, the input device 4 and associated input method integrate the keyboard input and the mouse input.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An input device for a data processing device, comprising:
    a touch-sensitive module comprising a capacitive touching and pressing module which comprises a capacitive sensor layer and a common electrode, configured to sense a first capacitance change resulting from a distance change between the capacitive sensor layer and the common electrode due to a keystroke on the capacitive touching and pressing module and an electrical property change resulting from a touch action of a touch object on the touch-sensitive module;
    an operation prompt interface disposed on a surface of the touch-sensitive module, configured to indicate regions for receiving the touch action and the keystroke; and
    a controller in communication with the touch-sensitive module, the controller issuing a first input signal to the data processing device in response to the sensed first capacitance change resulting from the keystroke, the controller issuing a second input signal to the data processing device in response to the sensed electrical property change resulting from the touch action.

2. The input device according to claim 1 wherein the touch-sensitive module further comprises an intermediate insulting layer disposed between the capacitive sensor layer and the common electrode and having at least one hole, the keystroke above the hole shortening a distance between the capacitive sensor layer and the common electrode to result in the first capacitance change between the capacitive sensor layer and the common electrode.

3. The input device according to claim 2 wherein the capacitive sensor layer comprises a plurality of sensor pads isolated from each other.

4. The input device according to claim 3 wherein the operation prompt interface comprises a keyboard pattern corresponding to the sensor pads.

5. The input device according to claim 4 wherein at least one key of the keyboard pattern has an area covering more than one of the sensor pads.

6. The input device according to claim 5 wherein the controller enters one of a first operation state and a second operation state in response to a switching operation by the user, the controller issuing the first input signal to the data processing device in response to the sensed first capacitance change resulting from the keystroke in the first operation state, the controller issuing the second input signal to the data processing device in response to the sensed electrical property change resulting from the touch action in the second operation state.

7. The input device according to claim 6 wherein the switching operation comprises flicking the key having the area covering more than one sensor pad.

8. The input device according to claim 6 wherein the controller is in the second operation state, a display of the data processing device being operated in a horizontal scroll mode to scroll left or right an image shown on the display when a double tap on a first end of the key is sensed, the display of the data processing device being operated in a vertical scroll mode to scroll up or down the image shown on the display when a double tap on a second end of the key is sensed, the display of the data processing device being operated in a high resolution mode to precisely move a cursor on the display when a double flick on the key is sensed.

9. The input device according to claim 3 wherein the controller groups a plurality of adjacent sensor pads into a key group.

10. The input device according to claim 1 wherein a default operation state of the controller is a first operation state and the first capacitance change resulting from the keystroke is sensed; the controller is switched from the first operation state to a second operation state in response to a switching operation and the electrical property change resulting from the touch action is sensed; and the controller is switched from the second operation state to the first operation state and the first capacitance change resulting from the keystroke is sensed if an idle status lasts a predetermined period of time.

11. The input device according to claim 1 wherein the controller is in a second operation state and the electrical property change resulting from the touch action is sensed, the controller issuing the second input signal representing a left mouse click in response to a tap or a double tap with more than one fingers on a left region of the touch-sensitive module, the controller issuing the second input signal representing a right mouse click in response to a tap or a double tap with more than one finger on a right region of the touch-sensitive module.

12. The input device according to claim 1 wherein the touch-sensitive module comprises a light source electrically connected to the controller, the controller controlling color and brightness of the light source in response to the touch action or the keystroke.

13. An input method used with an input device for a data processing device, the input device comprising a capacitive touching and pressing module which comprises a capacitive sensor layer and a common electrode, the input device sensing a capacitance change resulting from a distance change between the capacitive sensor layer and the common electrode due to a keystroke on the capacitive touching and pressing module and an electrical property change resulting from a touch action of a touch object on the input device, the input method comprising steps of:
  issuing a first input signal to the data processing device in response to the sensed capacitance change resulting from the keystroke in a first operation state;
  switching the input device from the first operation state to a second operation state in response to a switching operation;
  issuing a second input signal to the data processing device in response to the sensed electrical property change resulting from the touch action in the second operation state; and
  switching the input device from the second operation state to the first operation state to enable the input device to sense the keystroke if an idle status of the input device lasts a predetermined period of time.

14. The input method according to claim 13 wherein a default operation state of the input device is the first operation state and the input device is enabled to sense the keystroke, the input method comprising a step of:
  switching the input device from the first operation state to the second operation state in response to the switching operation to enable the input device to sense the touch action.

15. The input method according to claim 13 wherein the input device at least comprises a first key and a second key having a larger area than the first key, the switching operation comprising flicking the second key.

16. The input method according to claim 15 wherein the input device is in the second operation state and the input method comprises steps of:
  operating a display of the data processing device in a horizontal scroll mode to scroll left or right an image shown on the display when a double tap on a first end of the second key is sensed;
  operating the display of the data processing device in a vertical scroll mode to scroll up or down the image shown on the display when a double tap on a second end of the second key is sensed; and
  operating the display of the data processing device in a high resolution mode to precisely move a cursor on the display when a double flick on the second key is sensed.

17. The input method according to claim 13 wherein the input device is in the second operation state and the input method comprises steps of:
  issuing the second input signal representing a left mouse click in response to a tap or a double tap with more than one finger on a left region of the input device; and
  issuing the second input signal representing a right mouse click in response to a tap or a double tap with more than one finger on a right region of the input device.

18. An input device for a data processing device, comprising:
  a touch-sensitive module comprising a capacitive touching and pressing module which comprises a capacitive sensor layer and a common electrode, configured to sense a capacitance change resulting from a distance change between the capacitive sensor layer and the common electrode due to a keystroke on the capacitive touching and pressing module;

an operation prompt interface disposed on a surface of the touch-sensitive module, configured to indicate regions for receiving the keystroke; and a controller in communication with the touch-sensitive module, the controller generating a command in response to the sensed capacitance change resulting from the keystroke, providing at least one symbol code and a plurality of candidate words corresponding to the command according to a built-in input method editor, and issuing a word code representing a word selected among the candidate words by the user to the data processing device.

* * * * *